US006583791B2

(12) United States Patent
Berryman et al.

(10) Patent No.: US 6,583,791 B2
(45) Date of Patent: Jun. 24, 2003

(54) METHOD AND APPARATUS FOR COLOR-CORRECTION OF DISPLAY MODULES/LEDS OF RED, GREEN AND BLUE COLOR-CORRECTION COMBINATIONS

(75) Inventors: Walter Henry Berryman, Croydon (AU); John McRae Badcock, Clayton (AU)

(73) Assignees: Hybrid Electronics Australia Pty Ltd., Bayswater (AU); Persistent Vision Pty Ltd., Clayton (AU)

( * ) Notice: Subject to any disclaimer, the term of this patent is extended or adjusted under 35 U.S.C. 154(b) by 175 days.

(21) Appl. No.: 09/785,307

(22) Filed: Feb. 20, 2001

(65) Prior Publication Data

US 2001/0033258 A1 Oct. 25, 2001

Related U.S. Application Data

(63) Continuation of application No. PCT/AU99/00675, filed on Aug. 20, 1999.

(30) Foreign Application Priority Data

Aug. 20, 1998 (AU) ............................................. PP5361

(51) Int. Cl.[7] ............................ G09G 5/02; G09G 3/32; H04N 9/73

(52) U.S. Cl. ......................... 345/589; 345/83; 345/690; 348/655

(58) Field of Search ............................ 345/83, 690, 88, 345/72, 30, 589; 340/815.45; 348/655–656, 644–647, 649, 671, 678–9, 659; 358/518–523; 382/167–168

(56) References Cited

U.S. PATENT DOCUMENTS

| | | | | |
|---|---|---|---|---|
| 4,965,561 A | | 10/1990 | Havel | 345/46 |
| 4,992,704 A | | 2/1991 | Stinson | 315/312 |
| 5,184,114 A | * | 2/1993 | Brown | 345/83 |
| 5,266,817 A | | 11/1993 | Lin | 257/89 |
| 5,384,601 A | * | 1/1995 | Yamashita et al. | 348/577 |
| 6,313,816 B1 | * | 11/2001 | Kojima et al. | 345/83 |

FOREIGN PATENT DOCUMENTS

| | | |
|---|---|---|
| AU | 679442 | 11/1993 |

OTHER PUBLICATIONS

Extract from: Measuring Colour, Second Edition by R.W.G.Hunt, pp. 61–68. Published by Ellis Horwood.

Extract from: Color Science, Concepts and Methods, Quantitative Data and Formulae, 2$^{nd}$ Edition. By: Gunter Wyszechi and W.S. Stiles, pp. 127–131. Published by John Wiley & Sons.

* cited by examiner

*Primary Examiner*—Matthew C. Bella
*Assistant Examiner*—Anthony J Blackman
(74) *Attorney, Agent, or Firm*—Birch, Stewart, Kolasch & Birch, LLP

(57) ABSTRACT

Apparatus for color correcting a display module is disclosed. The display module includes a plurality of light emitting elements such as LEDs. The LEDs typically include sources of nominally red, green and blue colors. The apparatus includes a device for activating a light emitting element to emit an uncorrected first color and a device for activating at least one further light emitting element which emits a color other than the first color, to produce a corrected first color. An array of corrected display modules and a method of correcting a color in a display module are also disclosed.

17 Claims, 8 Drawing Sheets

METHOD AND APPARATUS FOR COLOR-CORRECTION OF DISPLAY MODULES/LEDS OF RED, GREEN AND BLUE COLOR-CORRECTION COMBINATIONS

This application is a continuation of PCT/AU99/00675 filed Aug. 20, 1999.

FIELD OF THE INVENTION

The present invention relates generally to multi-colour display systems, and more particularly to a method and apparatus for providing colour-correction of display modules of a type which may be used in multi-colour display systems. The invention is especially suited for use with three-colour modules. Each module may be constructed from three light-emitting elements such as light emitting diodes (LEDs) and may form one pixel of a multi-colour display system. It will be convenient to describe the method and apparatus in relation to that application. However, it should be understood that the invention is not thereby restricted to that application.

BACKGROUND OF THE INVENTION

Differences in intensity and colour of individual LEDs, having the same nominal colour, arise from variations in their manufacturing processes. These differences can produce noticeable unevenness in colour-rendition when groups of arrays of such LEDs are used in multi-pixel displays: for example, in a video-display panel.

The theory of colour-perception by human observers is well-established [1]–[4] and is usually described in relation to the Commission Internationale de I'Eclairage (CIE) chromaticity diagram, which enables the colour result to be determined for additive combination of pure spectral colours or of colours that are already impure. The radiation from a typical LED is "impure" because the light it emits is distributed over a range of wavelengths. The wavelength-distribution, or spectrum, is also variable from one LED to another LED even when the LEDs are from the same manufacturing process.

In the CIE chromaticity diagram, represented in summary form in FIG. 1, the range of colours that can be produced by additive combination of three primary colour sources is bounded by a triangle whose vertices lie at points representing the colours of the primary-sources. In order to produce the widest range of colours from three primary colour sources, the sources should be nominally red, green and blue, and should lie at points which enclose as much of the visible colour range as possible. Fortunately, a restricted range of colours is acceptable to most observers: for example, as used in colour television-receiver displays. FIG. 1 includes two solid-line triangles. Each triangle encloses a restricted range of colours obtainable by combining light-sources whose chromaticities lie at its vertices.

A colour display module can be constructed using three or more LEDs whose colours are nominally red, blue and green. An example of such a module is disclosed in U.S. Pat. No. 4,992,704. In relation to the CIE chromaticity diagram, a particular module can represent a range of colours defined by a triangle whose vertices are the actual colours of its component LEDs. Control of colour representation within the obtainable range may be achieved by adjusting the electrical current passing through each individual LED within a module.

The available range of colours will vary from one module to another, because of the differing spectra emitted by LEDs whose colour is nominally identical. Furthermore, the intensity of emitted light varies for nominally identical LEDs carrying the same current. In order to achieve consistent colour rendition across an array of LED pixel modules, both colour and intensity variations need to be reduced, relative to variations arising from the LED manufacturing process.

SUMMARY OF THE INVENTION

The present invention provides a method and apparatus for correcting the intensities and/or hues of primary colours in a multi-colour display module containing light sources, such as LEDs. The invention may allow display modules having variable intensity and hue to be assembled into arrays with relatively consistent intensity and colour rendition.

The principle of the present invention lies in the recognition that each nominally primary colour may be adjusted by the addition of small proportions of one or more of the other primary colours. Typically, three primary colours are employed, being red, green and blue, but this need not necessarily be the case. The adjusted primary colours will hereafter be termed "corrected" primary colours; and colours emitted by individual sources (eg. LEDs) prior to adjustment, will be termed "uncorrected" primary colours. In terms of the CIE chromaticity diagram, the corrected colours will lie within a triangle whose vertices are defined by the uncorrected colours. For colour-consistency across a multiplicity of display modules, the same corrected colours should lie within an achievable range for every module. Referring to FIG. 1, each solid-line triangle may be considered to represent the range of colours obtainable from a three-colour LED display module. The two modules differ in the chromaticity of their uncorrected primary colours. FIG. 1 exaggerates the difference, for the sake of clarity. The range of colours that both modules can represent is represented by the dashed-line triangle, whose vertices are encircled. For these two modules, the corrected primary colours may lie at the vertices of the dashed-line triangle, or within it.

In the CIE chromaticity diagram, the corrected primary colours for a multiplicity of display modules may lie at or within the vertices of a triangle which contains the range of colours that can be produced by every member of the multiplicity of modules. In order that arrays of such modules may display the widest possible range of colours, it is desirable for this triangle to be as large as possible. The corrected primary colours should as far as possible, be chosen to approximate pure primary colours: red, green and blue. The extent to which the corrected primary colours can approximate the desired primary colours can be determined from LED manufacturers' specifications and/or from empirical measurements performed on individual LED modules.

The corrected primary colours can be used to produce displays of variable colour and brightness by combining the corrected colours with different intensities. This is not unlike the production of variable-colour displays from pure additive primary colours, except that the range of colours able to be produced is reduced, firstly due to inherent impurity of the LED emission spectra, and secondly due to the mechanism of colour-correction proposed by the present invention.

Typically, but not necessarily, the intensities of corrected primary colours may be set by adjusting the proportion of time that each corrected primary colour is emitted. The time-proportion may be set by pulse-width modulation of LED currents, preferably at a repetition rate that is sufficient to prevent observable flicker. In correcting a particular primary colour, a main current may pass through an LED of the same nominal colour, and correction currents may be applied to LEDs of other colours, either concurrently or during part of a repetitive cycle.

The currents required for comparable light intensity may differ substantially for different colour LEDs. For this reason, it is conceivable that the correction current applied to one LED may exceed the main current in another. Therefore reference to "main" and "correction" currents should not be interpreted as a reference to "large" and "small" currents, except in relation to currents in an LED having a single colour.

The principle of the present invention may be realised via at least two distinct techniques. The two techniques may also be applied in combination.

A first technique may involve adding to an LED display module, a circuit composed of resistors and switches so that the characteristics of individual LEDs in the module may be compensated by a choice of resistor values. Once the characteristics are compensated, the module can be treated as a colour-corrected module, and incorporated into an array of such modules without taking further account of individual LED characteristics. This technique may be referred to as hardware-based reflecting the fact that colour-correction is hard-wired into the circuit associated with each module, typically at a stage of manufacture when the module is incorporated into a display-array.

A second technique may involve adding switches and resistors to an LED display module, without attempting colour-correction at the hardware level. Instead, stored calibration data about individual LED characteristics may be relied upon to calculate required durations of LED currents. Typically, this may involve some form of computer control of switch states, with LED calibration data recorded in a memory at the time that the display module is assembled into an array of such modules. During operation, intensity and colour data, specifying a desired display or image, may be combined with calibration data to calculate required switching times, and the LEDs may be switched on and off accordingly. This technique may be referred to as software-based, although it is possible for the same principle to be applied in a hard-wired processor, or by using firm-ware. The processor may be a general-purpose computer, a microcontroller, or a digital-signal processor, depending on the size of the pixel array and the nature of its application.

According to one aspect of the present invention there is provided a colour display module having spectrally corrected sources of light for use in a display panel having a plurality of like colour display modules, said display module including:

- sources of nominally red, green and blue colours, each source being subject to unwanted spectral variation;
- means associated with the nominally red source for activating the nominally green and blue sources to produce a spectrally corrected red source;
- means associated with the nominally green source for activating the nominally red and blue sources to produce a spectrally corrected green source; and
- means associated with the nominally blue source for activating the nominally red and green sources to produce a spectrally corrected blue source;
- whereby the range of colours available to be displayed by the spectrally corrected red, green and blue sources substantially does not vary from one module to another notwithstanding the spectral variation of the nominally red, green and blue sources.

According to a further aspect of the present invention there is provided a method of correcting a colour display module having sources of nominally red, green and blue colours, each source being subject to unwanted spectral variation, said module being suitable for use in a display panel having a plurality of like colour display modules, said method including the steps of:

- activating the nominally green and blue sources to produce a spectrally corrected red source;
- activating the nominally red and blue sources to produce a spectrally corrected green source, and
- activating the nominally red and green sources to produce a spectrally corrected blue source;
- whereby the range of colours available to be displayed by the spectrally corrected red, green and blue sources substantially does not vary from one module to another notwithstanding the spectral variation of the nominally red, green and blue sources.

To assist the further understanding of the invention, reference is now made to the accompanying drawings which illustrate preferred embodiments of the present invention. It is to be appreciated that these embodiments are given by way of illustration only and the invention is not to be limited by this illustration.

DETAILED DESCRIPTION OF THE PREFERRED EMBODIMENTS

Several embodiments of the principle of the present invention are described in the following detailed description. Two embodiments exemplify the hard-wired method described above and two exemplify a software-based approach and a composite approach.

Figure 1:
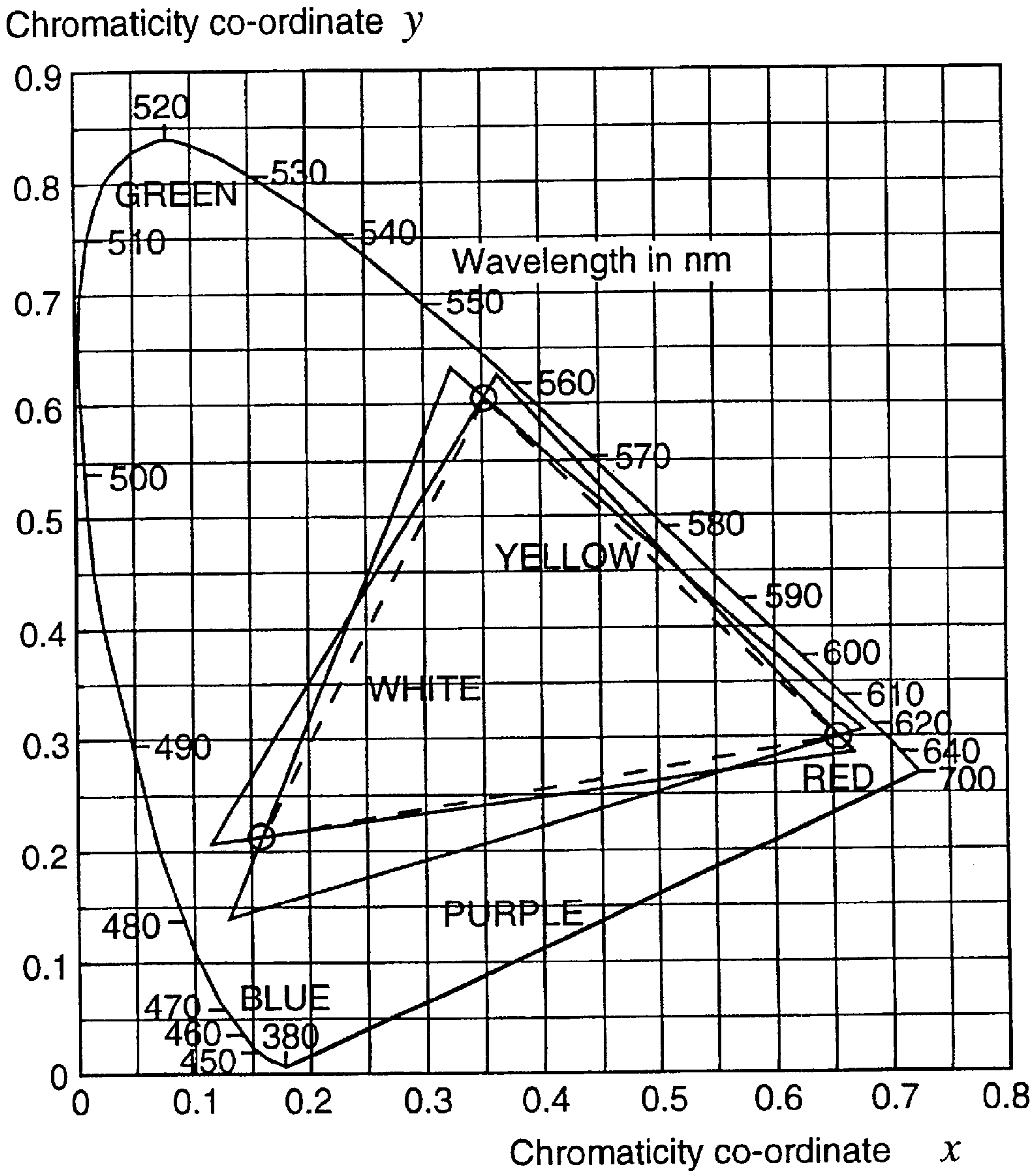
FIG. 1 shows a CIE chromaticity diagram, illustrating colours obtainable by additive combination of three-colours.
Figure 2:
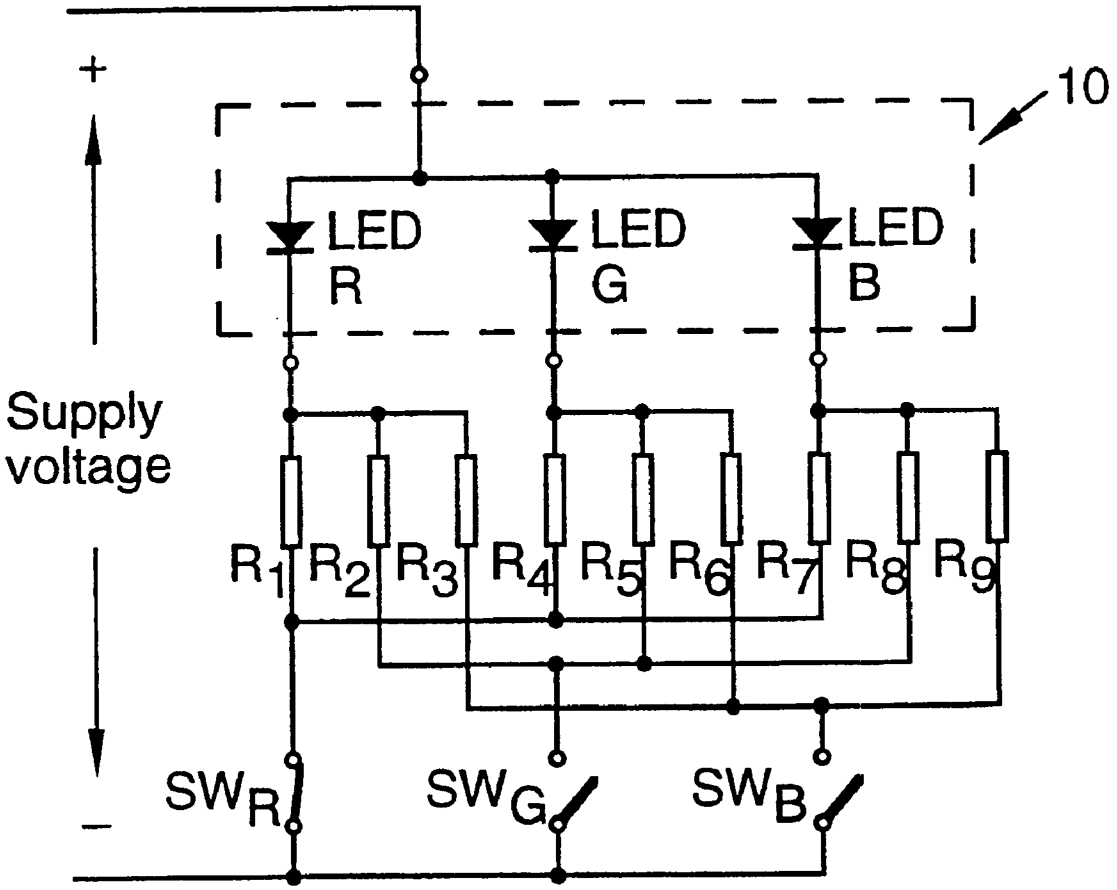
FIG. 2 shows a hard-wired colour-correction circuit according to a preferred embodiment of the invention for a common-anode LED display module.

The embodiment exemplified in FIG. 2, shows a display module 10 with three LEDs (LED R, LED G and LED B) in a common-anode configuration, supplied with current through resistors $R_1$–$R_9$ and switches $SW_R$, $SW_G$ and $SW_B$. In this and later embodiments, the switches could be electronic (bipolar transistors or MOS transistors, for example)

or electromechanical (reed relays, for example). Closure of any one switch causes currents to flow through all three LEDs. The resistors $R_1$, $R_4$, $R_7$ connected to the "red" switch $SW_R$ are chosen to set a desired operating current in the red LED (LED R), and to set currents in the green and blue LEDs (LED G and LED B respectively) to bring the combined light-output to a pre-determined corrected-red colour. When switch $SW_R$ is closed, as shown in FIG. 2, a main current set by resistance $R_1$ passes through LED R, which provides most of the light output from the module. Simultaneously, correction currents set by $R_4$ and $R_7$ pass through LED G and LED B respectively, whose light output combines with that of LED R to produce the corrected red primary colour. The resistors $R_2$, $R_5$, $R_8$ and $R_3$, $R_6$, $R_9$ connected to the green and blue switches, $SW_G$ and $SW_B$ respectively, are determined in an analogous way.

Figure 3:
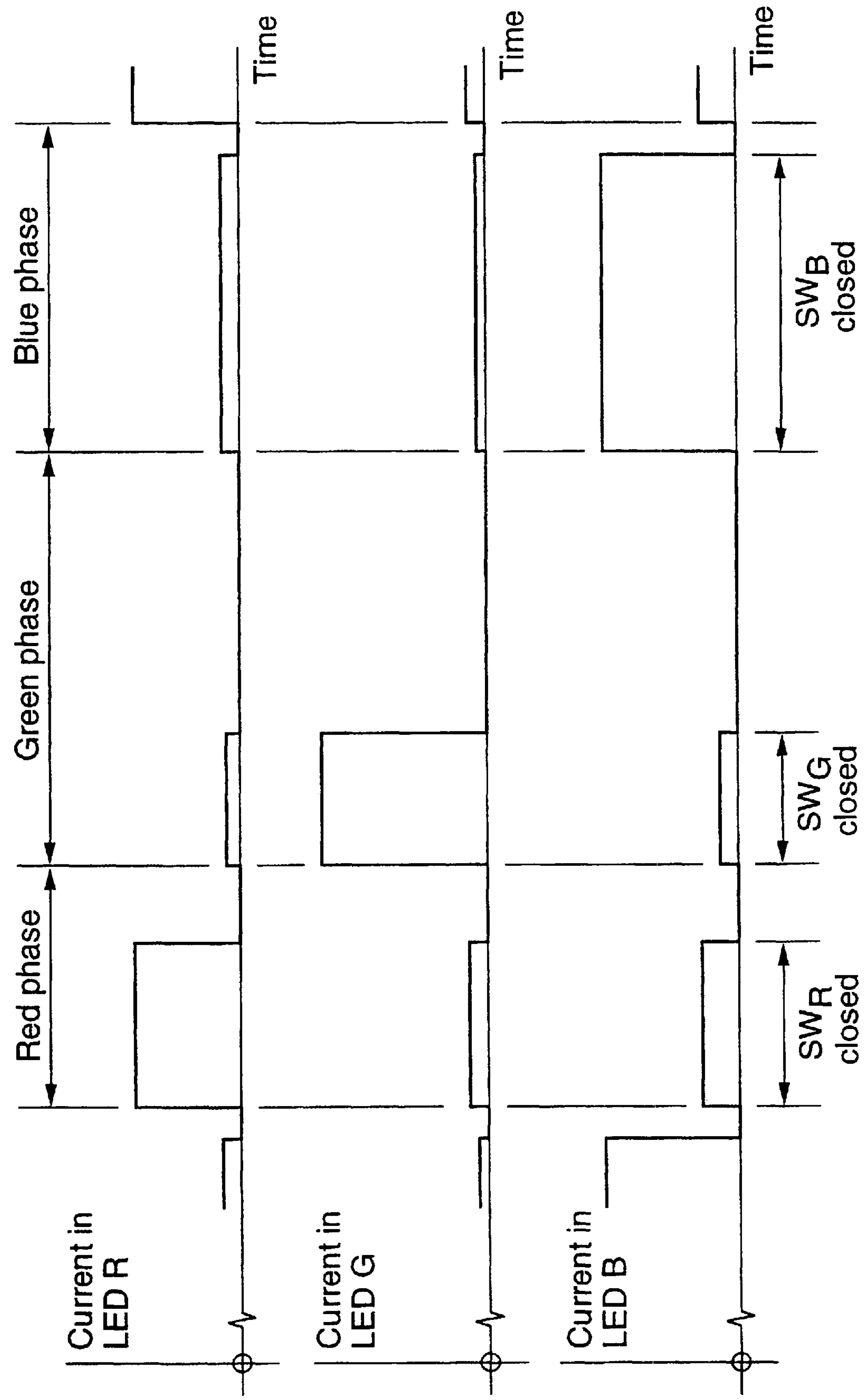
FIG. 3 shows example current-waveforms for the circuit of FIG. 2.

FIG. 3 illustrates an example of how a repetitive cycle may be established to share time among the three switches $SW_R$, $SW_G$ and $SW_B$ of FIG. 2. The cycle may be divided into three or more phases, not necessarily of equal duration. Each switch may be open or closed during its phase of the cycle, according to the desired output, but is open during phases allocated to other switches. Preferably the cycle rate is sufficient to avoid visible flicker.

In the example shown, $SW_R$ is closed during part or all of the red phase, allowing a main current to flow through the red LED R and correction currents to flow through the green LED G and blue LED B. Within the green and blue phases, similarly, main currents and correction currents can flow through switches $SW_G$ and $SW_B$ during intervals for which they are closed. The intensity of each corrected colour can be controlled by varying the proportion of available time that its corresponding switch is closed. This technique ensures that the proportions of the uncorrected colours in a corrected colour remain constant as the corrected-colour intensity is varied. In FIG. 3, the switch-closures are shown as starting at the beginning of their allotted phases, but this is not a necessary restriction to the circuit's operation.

The current-determining resistors $R_1$–$R_9$ in FIG. 2 may be replaced by current sources (switched current mirrors, for example), in order to gain immunity to variation of LED characteristics with ambient temperature.

An alternative way of using the module in FIG. 2 is to cause more than one switch to be closed simultaneously. The currents contributed to a particular LED by different switches may be approximately, but not exactly, additive. If current mirrors were used, as suggested above, the currents could be made truly additive. The advantage of simultaneous closure is an increase in the duty-cycle of each LED, and a consequent increase in maximum intensity for a given maximum LED current.

The above embodiment may be modified in an obvious way to accommodate a common-cathode LED pixel module.

Figure 4:
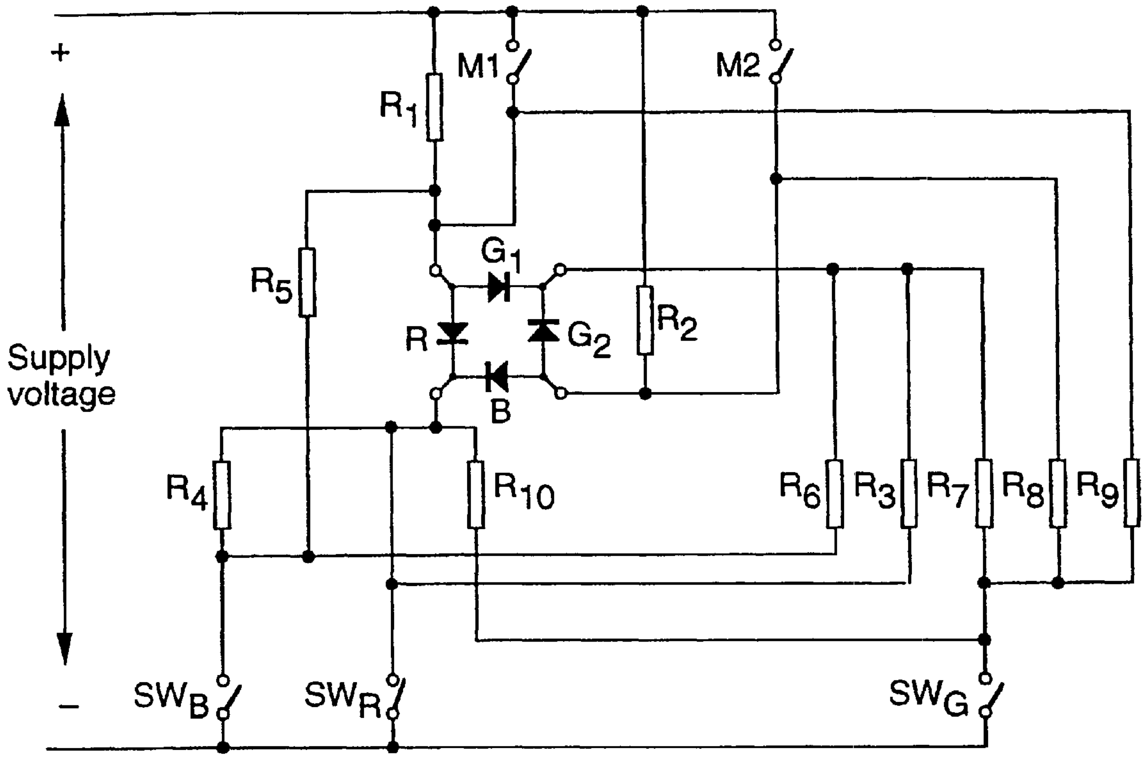
FIG. 4 shows a hard-wired colour-correction circuit according to another preferred embodiment of the invention for a bridge-connected LED display module.

The embodiment exemplified in FIG. 4, shows a display module with four LEDs (R, $G_1$, $G_2$ and B) arranged in a bridge configuration. For the sake of example, two green LEDs ($G_1$, $G_2$) and one each of red (R) and blue (B) are included in the module, but this choice is not essential to the invention or its embodiment. Like the embodiment of FIG. 2, the latter embodiment provides a means of setting main and correction currents in each LED. The master switches, M1 and M2, are opened and closed in a cyclic sequence of phases which include the switch-states: both open, M1 closed (M2 open) and M2 closed (M1 open). The durations of the phases may be fixed, but not necessarily equal. The master switches can be common to an array of LED modules. Preferably, the repetition rate of the cyclic sequence is sufficient to avoid visible flicker.

Figure 5:
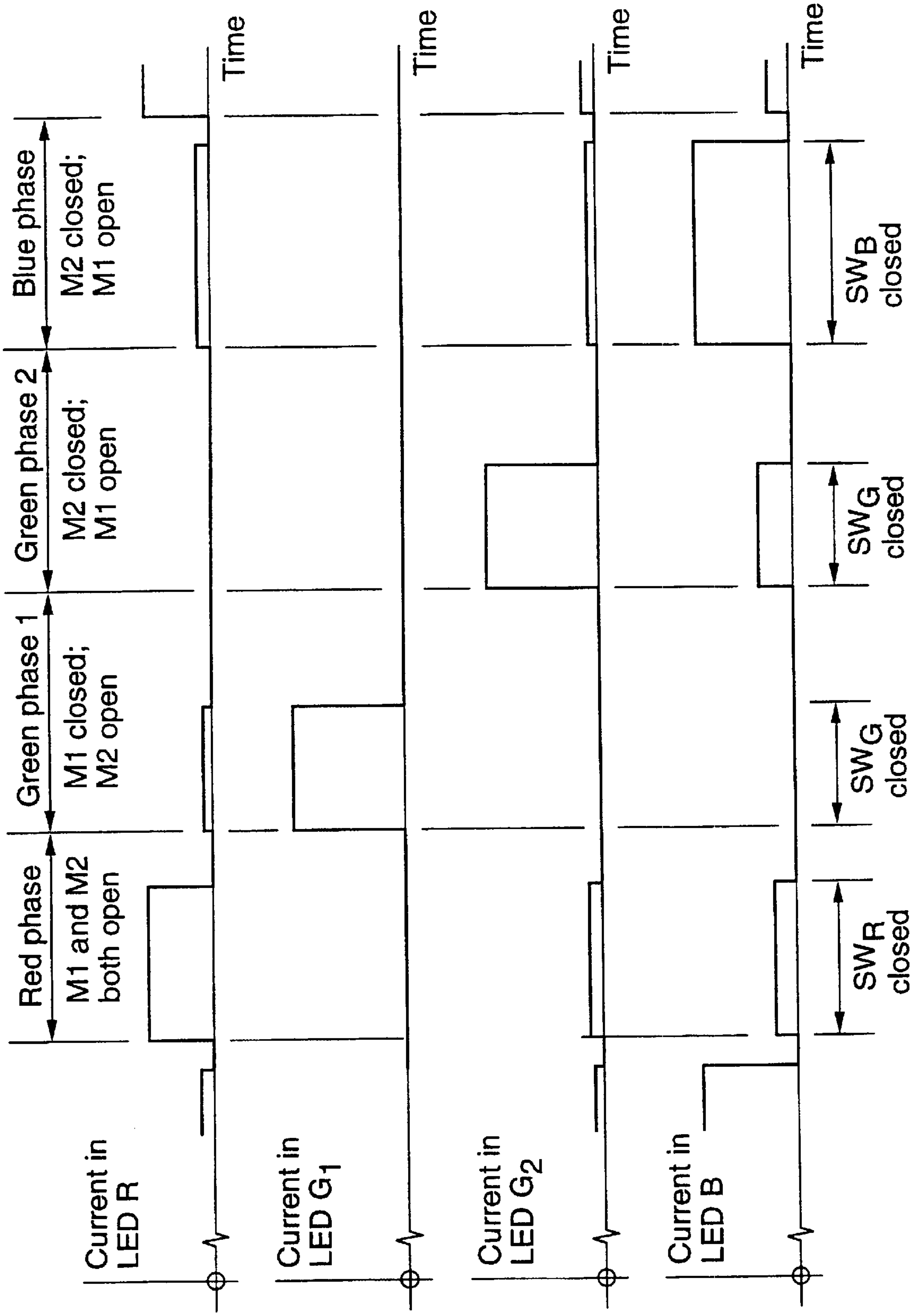
FIG. 5 shows example current waveforms for the circuit of FIG. 4.

FIG. 5 illustrates a cycle in which there are four phases, the durations of which are determined by opening and closing master switches M1 and M2 of FIG. 4. One of the colour-selection switches $SW_R$, $SW_G$ or $SW_B$ may be closed for part or all of each phase-interval, subject to a restriction that only a sub-set of the colour-selection switches is permitted to close within each phase. For example, in the particular circuit of FIG. 4, $SW_R$ may close only when M1 and M2 are both open; $SW_B$ may close only when M1 is open and M2 is closed, and $SW_G$ can be closed when either M1 or M2 is closed and the other master-switch is open.

Any corrected colour can be emitted by closing one of the colour switches $SW_R$, $SW_G$, $SW_B$ during all or part of the master-switch phase with which it is associated. For example, if M1 and M2 are open and $SW_R$ is closed, the current through the red LED (labelled R) is determined by a combination of $R_1$ and $R_5$ (in series with $R_4$, which is small). Correction currents are supplied to the blue (B) and green ($G_2$) LEDs through resistor $R_2$, with $R_3$ and $R_6$ determining the proportion that flows through $G_2$. Similar arguments apply under other conditions: when M1 is closed and the $SW_G$ is closed (with main current through $G_1$), when M2 is closed and $SW_G$ is closed (with main current through $G_2$), and when M2 is closed and $SW_B$ is closed (with main current through B).

The circuit shown in FIG. 4 is merely one example. Its details depend on the relative voltage-drops across LEDs of different nominal colours. An important feature of this circuit is that colour-correction can be associated with an individual LED pixel module, using master phase switches common to several modules, and switches for individual modules that activate each colour during part or all of a master-switch phase.

A further embodiment may use a digital processor and memory to control the duty-cycle of each LED in the display module, or an array of display modules. Whereas in the previous embodiments, colour-correction was performed by resistive circuits uniquely associated with each pixel, in this embodiment the circuit may be simplified and the intensity and colour characteristics of each pixel may be stored in memory, as a look-up table for example, and accessed by the processor in order to determine the time-intervals for which each LED should be switched on.

Figure 6:
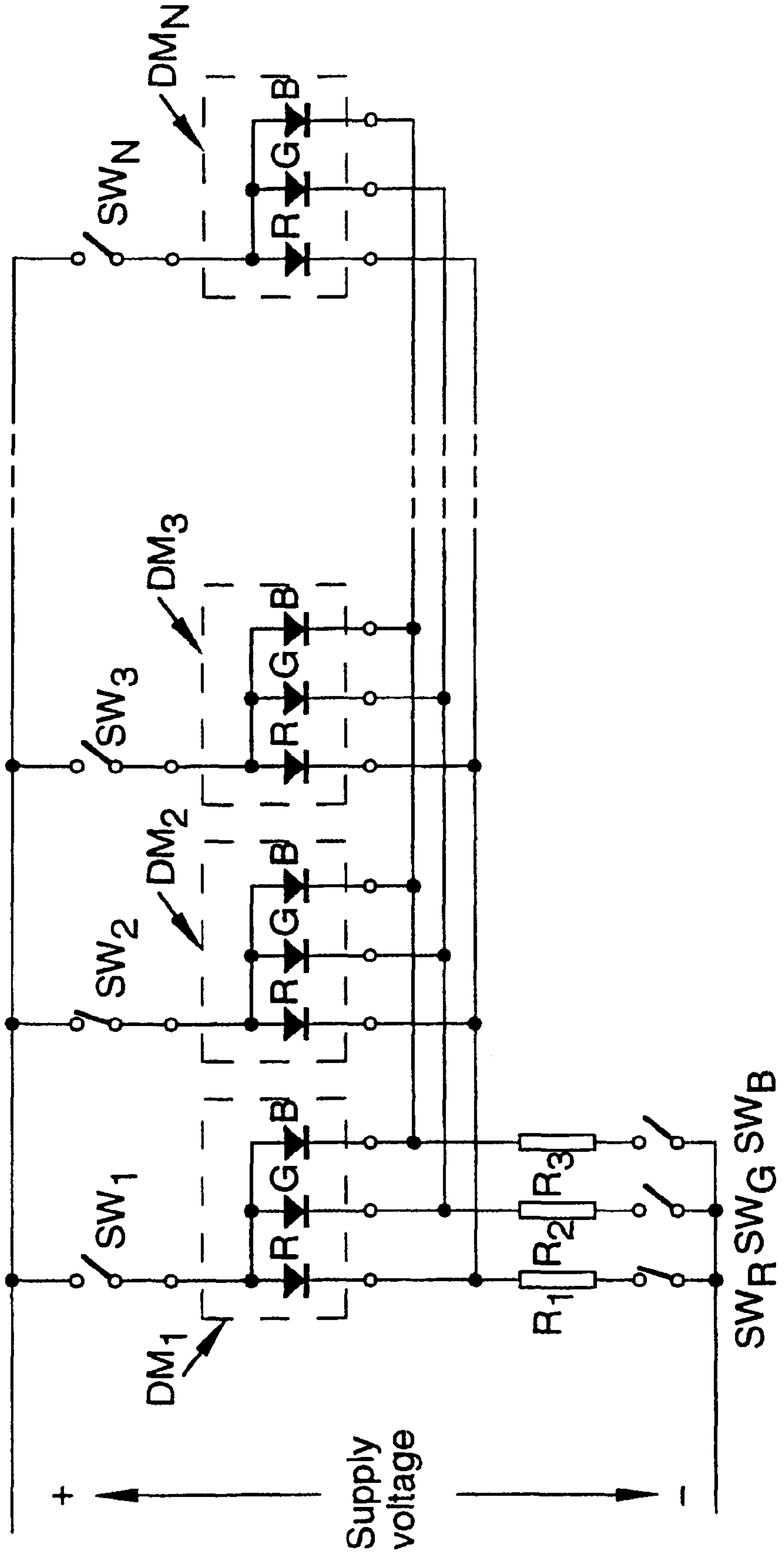
FIG. 6 shows an array of display modules with processor-controlled switches for use in software-based colour-correction of the modules according to another preferred embodiment of the invention.

By way of example of the latter embodiment, FIG. 6 shows an array of common-anode display modules (DM 1, 2, 3, . . . , N) and associated switches. The particular embodiment illustrated in FIG. 6 uses one set of switches ($SW_1$, $SW_2$, $SW_3$, . . . , $SW_N$) to select which module is being activated, and a second set of switches ($SW_R$, $SW_G$, and $SW_B$) to select the nominal LED colour of whichever module has been selected. This arrangement is merely one example; if sufficient outputs can be derived from the computer processor (not shown), the LEDs in an array can all be switched individually. This may provide higher average intensity for given maximum LED current than the arrangement illustrated. A key advantage of the latter embodiment is the simplicity of the hardware.

In order to set a particular display module to an arbitrarily-specified colour, the processor may access the stored calibration data for the LEDs, R, G and B, of which the module is composed. It may then calculate the required time-intervals for the red, green and blue switches, $SW_R$, $SW_G$ and $SW_B$, and turn the switches on and off in a cyclic manner, at a rate sufficient to avoid flicker.

In order to clarify the processor's task, it may be assumed that the calibration data for a display module is expressed in terms of the proportion of the time for which each LED in the circuit of FIG. 6 must conduct to produce each corrected primary colour of specified maximum intensity. Such calibration data would be specific to the resistor-values $R_1$, $R_2$ and $R_3$ and the power-supply voltage, as well as to the characteristics of the LEDs in an individual display module.

For example, colour-corrected red might require the red LED R to conduct for 32% of the time, the green LED G to conduct for 5% of the time, and the blue LED B to conduct for 2% of the time. Such calibration data may be expressed as a set of linear equations, or as a matrix equation, such as:

$$\begin{bmatrix}\text{Corrected red}\\ \text{Corrected green}\\ \text{Corrected blue}\end{bmatrix} = \begin{bmatrix}a_{11} & a_{12} & a_{13}\\ a_{21} & a_{22} & a_{23}\\ a_{31} & a_{32} & a_{33}\end{bmatrix}\begin{bmatrix}\text{Uncorrected red}\\ \text{Uncorrected green}\\ \text{Uncorrected blue}\end{bmatrix} \quad (1)$$

where $a_{11}$=0.32, $a_{12}$=0.05 and $a_{13}$=0.02 in the numerical example, and the matrix coefficients are to be interpreted as the proportions of time for which the uncorrected primary colour LEDs are to be switched on in order to produce the corrected primary colours at full intensity. The operation on the right-hand side of the equation is a conventional matrix multiplication.

It may be assumed that the data to be displayed is expressed in terms of the amounts of (corrected) primary colours required to produce a particular intensity and hue in each display module. This would be so for the RGB signals supplied to a colour television or video-display monitor, for example. The amounts of corrected red, blue and green can be specified by coefficients $b_1$, $b_2$ and $b_3$, as follows, $$\text{Desired colour} = [b_1 \ \ b_2 \ \ b_3]\begin{bmatrix}\text{Corrected red}\\ \text{Corrected green}\\ \text{Corrected blue}\end{bmatrix} \quad (2)$$

The proportions of time, for which the uncorrected primary colour LEDs need to be switched on, follow directly by substituting equation (1) into equation (2) and performing the multiplications and additions implied by their combination. This calculation may be performed by the processor for each pixel module, using its individual calibration data and the primary-colour amounts specified by some external device, such as a video-signal source. The processor is required to turn switches ($SW_1 \ldots SW_N$ and $SW_R$, $SW_G$ and $SW_B$) on and off at appropriate times to achieve the calculated time-proportions and to do so at a rate sufficient to avoid flicker.

If the output lines that are available from the processor are insufficient for the embodiment illustrated in FIG. 6, addressable latches can be used to drive the switches. The processor may only need to address each latch briefly, compared to the cycle-period, in order to change its state and turn the associated switch on or off.

An alternative way of using the circuit in FIG. 6 is to switch on each of the colour-correction LEDs for part of the conduction interval of the LED whose colour is being corrected. Using the same numerical example as before, a half-maximum-intensity colour-corrected red would be obtained by switching the red LED on for 16% (50% of 32%) of the repetitive cycle, and within the same part of the cycle, switching the green and blue LEDs on for 2.5% and 1% of the cycle-period. This method may reduce the computational load on the processor.

Figure 7:
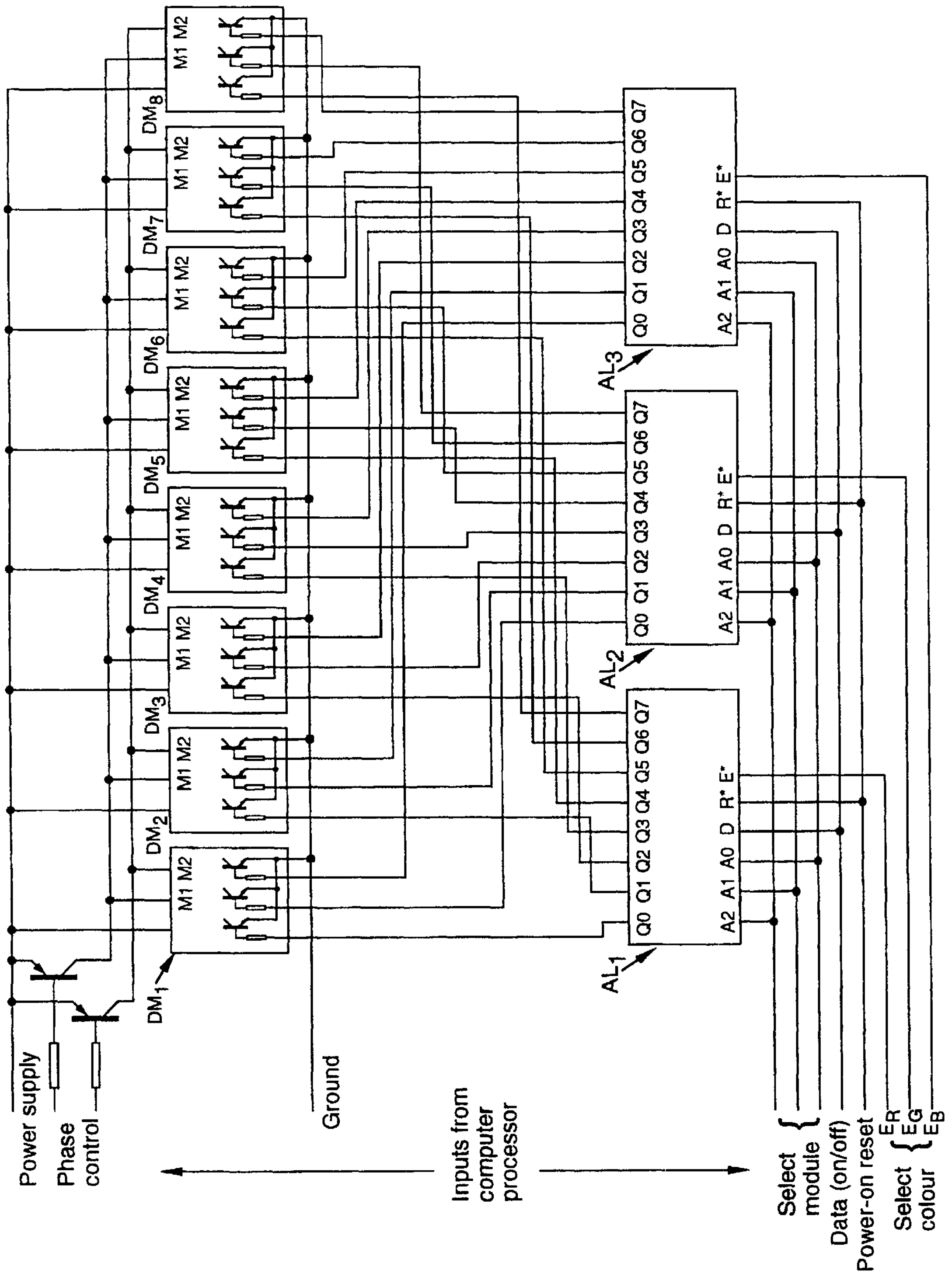
FIG. 7 shows an eight-module display array with processor-controlled addressable latches for use in software-based colour-correction of the modules according to another preferred embodiment of the invention.

The embodiment shown in FIG. 7, is a composite scheme, illustrating several of the features described earlier. The display modules DM1–DM8 may be similar to those in FIG. 6, which is what the module representation in FIG. 7 is intended to imply. Alternatively, with minor changes to the circuit, the display modules may take the form illustrated in FIG. 2 or FIG. 6. The detailed form of the display modules is not a central issue in this embodiment. The point is that the concept of FIG. 7 can be applied to various forms of display module, because it allows both the upper and lower switches (shown as transistors) to be controlled by the processor. Either the upper or lower switches, or some combination of them, can be common to a number of display modules.

FIG. 7 shows the use of addressable latches AL1 to AL3 to demultiplex a limited number of output lines from a processor, as described earlier. Only eight modules are shown, but the principle can be extended in an obvious way to a larger number of modules, preferably a power of two, eg. 16, 32, 64 . . . . With reference to the diagram, a particular module is selected by the address lines (A2, A1, A0). A particular LED colour, corrected or uncorrected depending on the form of the module, is selected by asserting an enable input ($E_R$, $E_G$ or $E_B$) of one of the three latches. With appropriate relative timing of the processor outputs, the new state of the selected latch is determined by a high or low logic level on the Data output. The processor needs to address a particular latch twice per cycle: once to turn the associated LED (or combination of LEDs) on and once to turn it off. The power-on reset may be used to ensure that all latches are in a known state when power is first applied to the circuit.

Figure 8:
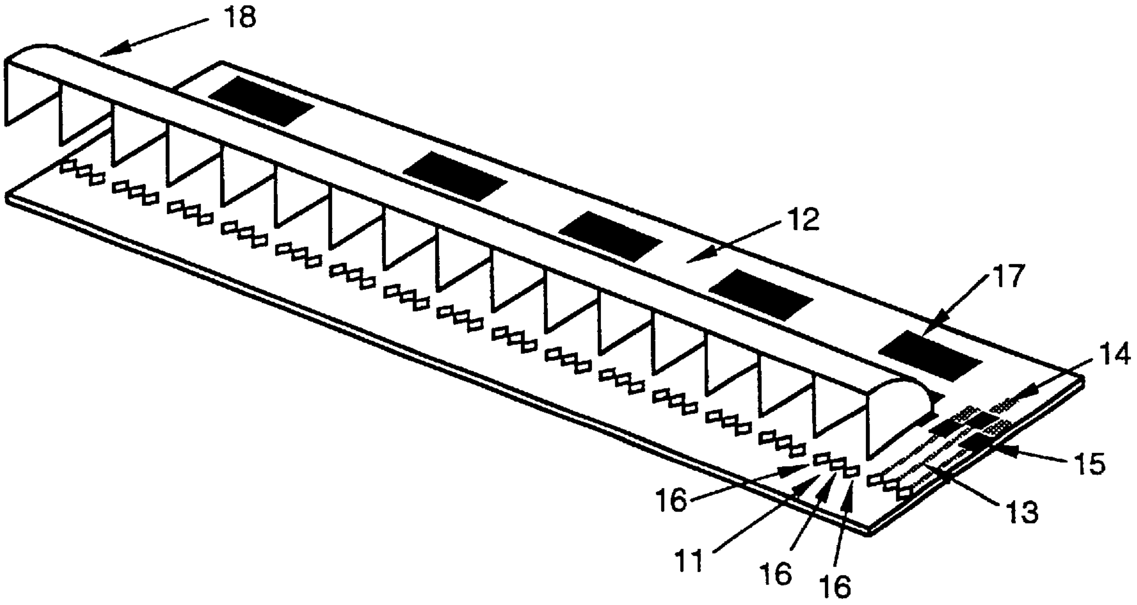
FIG. 8 shows a linear array of display modules suitable for use in a display panel.

FIG. 8 shows a display component including a linear array of display modules 11, together with electronic driving circuits for the array. The component may be built on a ceramic substrate 12, with printed thick-film conductive tracks 13 and resistors 14, or by using conventional printed-circuit construction, and/or other technology. Driver transistors 15, LEDs 16 and integrated circuits 17 used for controlling LED currents may be either surface-mount packaged components soldered to printed pads, or die-form devices with wire-bond connections to the pads.

Each display module 11 includes a row of three or more LEDs 16, nominally red, green and blue primaries, enclosed within one compartment of a reflector 18 and encapsulated in an optically-translucent medium 19 (refer FIG. 9) that scatters and diffuses light output. In FIG. 8 reflector 18 is raised from substrate 12 to reveal LEDs 16 underneath. In practice it may sit directly on substrate 12, near its edge. One purpose of optical medium 19 is to mix the three primary colours, so that a display module 11 is not perceived as three separate sources of light. Another purpose of optical medium 19 is to spread radiated light over a relatively wide angular range, so that display module 11 approximates a Lambertian source, presenting a consistent brightness and colour from different points of view.

Driver transistors 15 that supply currents to LEDs 16 are mounted behind reflector 18, together with resistors 14. The values of resistors 14 set the main and correction currents for each LED 16. In a preferred embodiment, resistors 14 may be in the base circuits of transistors 15, which are operated in an unsaturated mode, so that the LED currents are relatively independent of LED voltage-drop. Alternative circuits could use saturated transistors, with series collector resistors to define the LED currents, or current-mirror circuits, which would almost eliminate any dependence of LED currents on the current gains of the transistors.

Digital circuits for switching transistors 15 on and off may also be mounted on substrate 12, as an integral part of the display component.

An advantageous feature of the aforementioned embodiment of the invention is that thick-film resistors 14 may be adjusted in value, using laser-trimming equipment for example, to adjust the currents of LEDs 16 to desired values. In this way, parameter variations of transistors 15 and LEDs 16 may be compensated during the manufacturing process. The laser-trimming process can be actively controlled by feedback from an instrument that measures the intensity and chromaticity of each LED 16. By this means, LED currents can be set to achieve consistent target values of intensity and chromaticity for compensated primary colours. It is evident that trimming resistors 14 during manufacture of the display component obviates the need for further adjustment, calibration or software compensation of the array of display modules when it is incorporated into a larger item of equipment, such as a video display panel.

The thick-film technology described above may also facilitate temperature-compensation of the display-array. Resistive inks used to print resistors can be chosen to have desired temperature coefficients, appropriate to counteract thermal-dependencies of transistors and LEDs, which are likely to be significant over the operating temperature range of a typical installation. An alternative, or complementary, method of temperature compensation may be to adjust the supply voltage to the complete circuit in response to operating temperature.

The display-array component may typically be used by grouping a number of such components into a rectangular array or tile, constructed as a row of parallel substrates supported by an orthogonal motherboard or back-plane. A number of these tiles would then be assembled to construct a larger display panel, containing many thousands of display modules if television or computer-monitor level of resolution is required.

Figure 9:
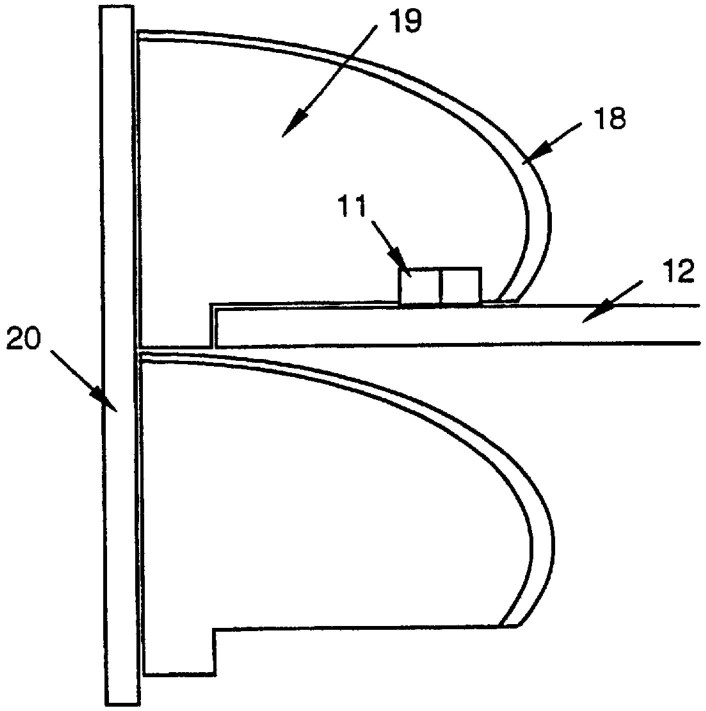
FIG. 9 shows a cross sectional view of a pair of display arrays incorporated in a display panel.

In order to reduce visually-obtrusive borders between linear arrays when they are grouped into tiles, the top edge of reflector 18 and the edges of the divisions between its compartments may be brought forward of substrate 12, as shown in the cross-sectional view of FIG. 9. These edges can be made substantially thinner than substrate 12. The diffusing medium 19 can fill the space enclosed by reflector 18, including the region immediately in front of substrate 12. If the lines of demarcation between display modules are regarded as obtrusive, a moderately-diffusing screen 20 could be placed in front of the whole array.

The shape of reflector 18 may be chosen to provide a fairly broad angular distribution of light output, which may be further broadened and smoothed by the diffusing medium 19. To this end, the reflector compartments may be curved in two planes: in one shown by the cross-section of FIG. 9 and in a plane orthogonal to the cross-section.

Finally, it is to be understood that various alterations, modifications and/or additions may be introduced into the constructions and arrangements of parts previously described without departing from the spirit or ambit of the invention.

REFERENCES

[1] Y. Le Grand, *Light, Colour and Vision,* 2nd ed., Chapman and Hall Ltd: London, 1968; 564 pp.

[2] G. Wyszecki and W. S. Stiles, *Color Science. Concepts and Methods, Quantitative Data and Formulas,* John Wiley and Sons, Inc: New York, 1967; 628 pp.

[3] R. W. G. Hunt, *Measuring Colour,* Ellis Horwood Limited: Chichester, 1987; 221 pp.

[4] CIE, *Colorimetry,* 2nd ed., Commission Internationale de I'Eclairage: Vienna, 1986; Publication No 15.2, 77 pp.

What is claimed is:

1. A colour display module having spectrally corrected sources of light for use in a display panel having a plurality of like colour display modules, said display module including:

sources of nominally red, green and blue colours, each source being subject to unwanted spectral variation;

means associated with the nominally red source for activating the nominally green and blue sources to produce a spectrally corrected red source;

means associated with the nominally green source for activating nominally red and blue sources to produce a spectrally corrected green source; and means associated with the nominally blue source for activating the nominally red and green sources to produce a spectrally corrected blue source;

whereby the range of colours available to be displayed by the spectrally corrected red, green and blue sources substantially does not vary from one module to another notwithstanding the spectral variation of the nominally red, green and blue sources.

2. A colour display module according to claim 1 wherein the range of colours able to be displayed by the nominally red, green and blue sources is defined on a chromaticity diagram by a triangle whose vertices are the actual colours of the nominal sources and the range of colours able to be displayed by the spectrally corrected red, green and blue sources is a subset of colours falling within said triangle, the subset of colours being substantially identical for each display module of said plurality of like colour display modules.

3. A display module according to claim 1 wherein each source includes a light emitting diode.

4. A display module according to claim 1 wherein said means for activating includes means for passing a controlled current through each light source.

5. A display module according to claim 4 wherein said means for passing a controlled current includes a resistor associated with each source.

6. A display module according to claim 4 wherein said mean for passing a controlled current includes means for pulse width modulating the current.

7. A display module according to claim 6 wherein said means for pulse width modulating the current includes a digital processor.

8. A display module according to claim 6 wherein said means for pulse width modulating the current adopts a rate of modulation which is sufficient to prevent observable flicker.

9. A method of correcting a colour display module having sources of nominally red, green and blue colours, each source being subject to unwanted spectral variation, said module being suitable for use in a display panel having a plurality of like colour display modules, said method including the steps of:

activating the nominally green and blue sources to produce a spectrally corrected red source;

activating the nominally red and blue sources to produce a spectrally corrected green source, and activating the nominally red and green sources to produce a spectrally corrected green source;

whereby the range of colours available to be displayed by the spectrally corrected red, green and blue sources substantially does not vary from one module to another notwithstanding the spectral variation of the nominally red, green and blue sources.

10. A method according to claim 9 wherein the range of colours able to be displayed by the nominally red, green and blue sources is defined on a chromaticity diagram by a triangle whose vertices are the actually colours of the nominal sources and the range of colours able to be displayed by the spectrally corrected red, green and blue sources is a subset of colours falling within said triangle, the sunset of colours being substantially identical for each display module of said plurality of like colour display modules.

11. A method of claim 9 wherein each source includes a light emitting diode.

12. A method according to claim 9 wherein said step of activating each source includes passing a controlled current through the source of light.

13. A method according to claim 12 wherein the current is controlled by a resistor associated with each source.

14. A method according to claim 12 wherein the current is controlled by a pulse width modulation.

15. A method according to claim 14 wherein the current is controlled by a digital processor.

16. A method according to claim 14 wherein the pulse width modulation is performed at a range which is sufficient to prevent observable flicker.

17. A colour display panel incorporating a plurality of like colour display modules, each in accordance with claim 11.

* * * * *